E. BENJAMIN.
Sawing-Machines.

No. 137,284. Patented April 1, 1873.

Witnesses
G. L. Chapin
E. J. Chapin

Inventor
Edwin Benjamin

UNITED STATES PATENT OFFICE.

EDWIN BENJAMIN, OF CHICAGO, ILLINOIS, ASSIGNOR OF ONE-HALF HIS RIGHT TO SAMUEL W. PEASE, OF SAME PLACE.

IMPROVEMENT IN SAWING-MACHINES.

Specification forming part of Letters Patent No. 137,284, dated April 1, 1873; application filed March 3, 1873.

*To all whom it may concern:*

Be it known that I, EDWIN BENJAMIN, of Chicago, in the county of Cook and State of Illinois, have invented a new and useful Improvement in Machines for Sawing Siding, of which the following is a specification:

The present invention relates to that class of machines which is used to manufacture siding or clapboards by sawing diagonally through boards or planks of the proper width and thickness to make two sidings, each having a thick and thin edge; and its nature consists in the novel means for adjusting the feed-rollers to a line which is parallel to the saw so that the rollers may have a like bearing on the board passing through the machine; and in combining the feed-rollers with a tilting carriage and carriage-track, toothed wheels, screw-rod, and depending supports, whereby the rollers are readily brought at any required angle relative to the saw, as hereinafter described and shown.

Figure 1:
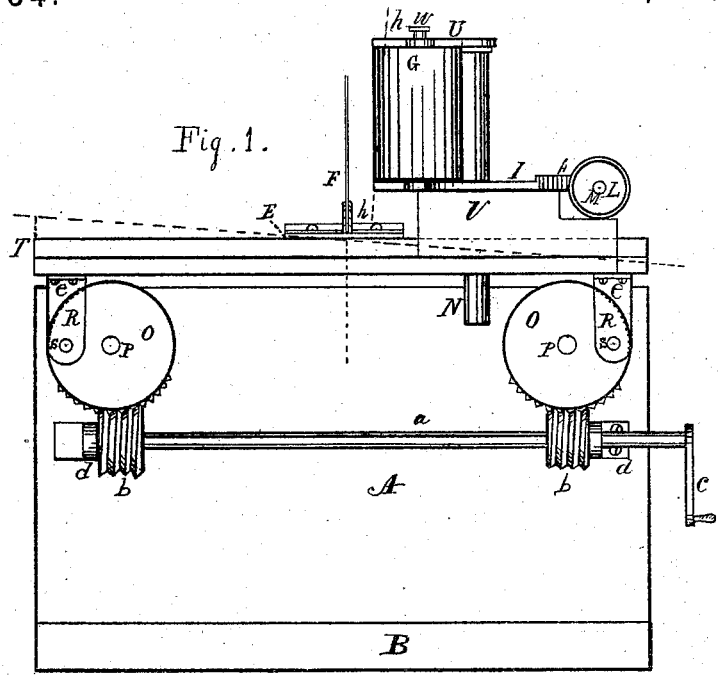
Figure 2:
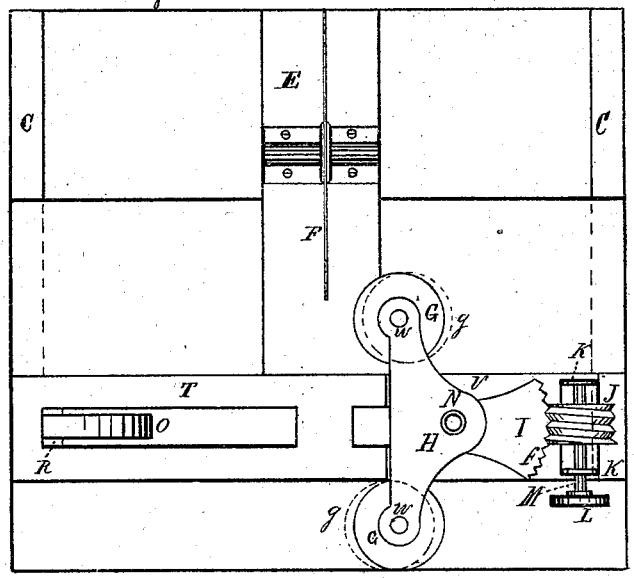

In the drawing, Figure 1 is a front elevation of my improvement in machines for sawing siding; Fig. 2, a plan or top view thereof.

A B C is a suitable frame for supporting the mechanism of the machine, which may be of wood or iron, iron, however, being generally used in practice. T V represent a tilting carriage which is supported by means of depending standards R R, bolted to the carriage at *e e*, and pivoted to the toothed wheels O O at S S, Fig. 1. These wheels O O are pivoted to the frame of the machine at P P so as to rotate, and they are turned by means of a screw-rod, *a b*, which has bearings in bridges *d*, secured to that part of the frame shown at A, a crank, *c*, being used to turn the said screw-rod. That part of carriage T V shown at V is arranged to slide on the part T, so as to bring the feed-rollers G G to or from the saw F; and there is pivoted to it a rack-plate, I *f*, by means of a sleeve, N, passing through the carriage T V, that part of the carriage shown at T being slotted out longitudinally to admit of the part V sliding on it. The plate I at its inner end is provided with two vertical bearings, *w*, to which the rollers G are fastened, and which project far enough above a cap-plate, H, to receive pinions for rotating said rollers. The cap-plate H supports the upper ends of the bearings *w*, and the upper end of the sleeve N in which the shaft of a spur-wheel is to be put for rotating the pinions which are to be fastened to the tops of bearings *w*.

This gearing is described simply to show how the rollers are operated; nothing, however, new is claimed on it, as it is well known and understood.

A screw-rod, M J, is arranged to rotate in bridges K K, Fig. 2, for the purpose of turning the rack-plate I *f* on its pivot N, in order to bring the feed-rollers G in a line parallel to the saw F, the dotted lines *g g* showing how the rollers G may be affected by turning the feed-wheel L attached to screw-rod M J, Fig. 2.

In the drawing only one set of rollers, G G, rack I *f*, sleeve N, screw-rod M J, and upper carriage V are shown; but in practice exact reverse counterparts are to be used on the opposite side of the saw, the carriage T operating both sets of rollers.

In setting the rollers G G on the inclined line *h h*, Fig. 1, it is only necessary to turn the crank *c*. Any desired angle may be attained by this means.

The material used in the manufacture of the mechanism should be iron, and the workmanship should be good.

I claim and desire to secure by Letters Patent of the United States—

1. The combination of the rollers G G, rack-plate I *f*, pivot-sleeve N, plate H, and screw-rod M J, substantially as and for the purpose set forth.

2. The combination of the rollers G G, carriage T V, depending standards R, toothed wheels O O, sleeve N, and screw-rod *a b*, as and for the purpose set forth.

EDWIN BENJAMIN.

Witnesses:
G. L. CHAPIN,
Mrs. E. J. CHAPIN.